2,806,813

INSECTICIDAL COMPOSITIONS COMPRISING 2-(DICHLOROMETHYL)-1,4,5,6,7,7-HEXACHLOROBICYCLO[2.2.1]-5-HEPTENE

Albert H. Haubein, Christiana, Del., assignor to Hercules Powder Company, Wilmington, Del., a corporation of Delaware No Drawing. Application December 16, 1954, Serial No. 475,817

5 Claims. (Cl. 167—30)

This invention relates to new compositions of matter and more particularly to 2-(dichloromethyl)-1,4,5,6,7,7-hexachlorobicyclo[2.2.1]-5-heptene and to insecticidal compositions containing the same as the essential toxicant.

Many compounds having a chlorine content in the range of 65–75% have been disclosed in the art as insecticides. However, most of them are not successful commercially because they are too low in insecticidal activity at low concentrations and are lacking in sufficient selectivity between insects and mammals when used in sufficient concentration to be effective as insecticides.

Now in accordance with the present invention it has been found that compounds of the chemical formula

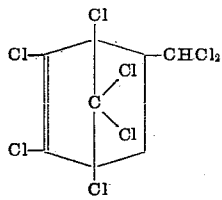

can be produced with high insecticidal activity either by chlorination of the adduct of hexachlorocyclopentadiene and acrolein with phosphorus pentachloride or by chlorination of the adduct of hexachlorocyclopentadiene and allyl chloride with chlorine gas. Compounds of the above formula are distinguished from adducts of cyclopentadiene and dienophiles such as allyl chloride in that the double bond in the former is not attacked by chlorine while the double bond of the latter is saturated by addition of chlorine to the double bond prior to any chlorination by substitution.

The method of preparing the chlorinated adduct of this invention and of using the product, as well as tests on its toxicity to insects and mammals, is set forth in more detail in the following examples where all parts and percentages are by weight.

Example 1

A mixture of 125 parts hexachlorocyclopentadiene and 38 parts allyl chloride was heated in a sealed tube at 142–144° C. for 30 hours. The resulting product was distilled to recover 13 parts hexachlorocyclopentadiene and 135 parts 2 - chloromethyl - 1,4,5,6,7,7 - hexachlorobicyclo - [2.2.1] - 5 - heptene boiling at 96–106° C./0.15 mm. pressure, M. P. 52–54.2° C. when crystallized from alcohol. Analysis of this product showed 71.0% chlorine.

A solution of 175 parts 2 - chloromethyl - 1,4,5,6,7,7-hexachlorobicyclo - [2.2.1] - 5 - heptene in 520 parts carbon tetrachloride was exposed to actinic light and heated to 75° C. while passing chlorine gas into the solution. After 36 parts chlorine had reacted, the reaction was stopped and the mixture was washed with aqueous sodium carbonate and water. The chlorinated 2 - chloromethyl-1,4,5,6,7,7 - hexachlorobicyclo - [2.2.1] - 5 - heptene was recovered as 190 parts yellow viscous residue by distilling off the solvent up to 100° C. at 18 mm. pressure. This chlorinated product analyzed 73.7% chlorine, corresponding to 2 - dichloromethyl - 1,4,5,6,7,7 - hexachlorobicyclo-[2.2.1]-5-heptene. Infrared absorption spectra confirmed the structure as corresponding with the same product made in accordance with Example 2 and also confirmed the presence of the double bond.

Toxicity tests are tabulated hereinafter.

Example 2

A solution of 278 parts hexachlorocyclopentadiene and 56 parts acrolein in 45 parts xylene was heated under reflux while gradually raising the temperature from about 60° C. to about 140° C. as the acrolein underwent condensation with the hexachlorocyclopentadiene. This heating process took 48 hours. The solvent was then removed at 100° C. under reduced pressure and the residue was sublimed at 100–125° C. at 0.7 mm. pressure. The sublimed solid amounting to 125 parts was 1,4,5,6,7,7-hexachlorobicyclo - [2.2.1] - 5 - heptenyl - 2 - carboxaldehyde which analyzed 63.2% chlorine and 9.3% carbonyl. This adduct was then heated with 200 parts phosphorus pentachloride at about 100° C. for 16 hours. The resulting product was taken up in ether, washed with water, with 10% aqueous sodium hydroxide and then with water. The ether layer was then dried over anhydrous sodium sulfate. After distilling off the ether, the product was distilled to recover 106 parts 2 - dichloromethyl - 1,4,5,6,-7,7 - hexachlorobicyclo - [2.2.1] - 5 - heptene b. p. 135–148° C./0.6 mm. which analyzed 73.6% chlorine. Infrared absorption data showed this product to be the same as that of Example 1. Toxicity data are tabulated hereinafter.

The comparative toxicity to insects and to mammals of the products of these examples is set forth in the table below.

| Toxicant of— | $LD_{50}$ [1] Houseflies | $LD_{50}$ [2] Albino Rats |
|---|---|---|
| Example 1 | 230 | 2,400 |
| Example 2 | 150 | 2,400 |

[1] Concentration in deodorized kerosene (mg. per 100 ml. solution) required for 50% kill in 20 hours.
[2] Weight of product in mg. per kilogram of body weight required for 50% kill in 2 weeks.

The $LD_{50}$ for houseflies was determined by dissolving the compound of the example named in deodorized kerosene of different concentrations. A 0.8 ml. sample of each concentration was sprayed into a cage of 50 three-day-old flies. The sprayed flies were then anesthetized with carbon dioxide and transferred to clean cages where they were left for 20 hours. The number of dead flies was determined at the end of 20 hours and the concentration which killed 50% of the flies was recorded as $LD_{50}$ for houseflies in the tabulation.

The $LD_{50}$ for albino rats was determined by feeding weighed rats in groups of 5 measured amounts of a 5% solution (weight/volume) in corn oil by means of a stomach tube. Mortality records were noted at the end of two weeks after administration. The weight of compound in mg. per kg. of body weight required to kill 50% of the rats in this period of time was taken as $LD_{50}$ in the tabulation.

A product of chlorination of the Diels-Alder adduct of allyl bromide and hexachlorocyclopentadiene corresponding to the products of this invention in which bromine is substituted for one of the chlorine atoms and which contains up to one atom of bromine in the molecule on the chloromethyl group is substantially equivalent to the product of this invention in toxicity to flies but is less economical to produce.

Moreover, the chlorination of the allyl bromide adduct produces an effective amount of the product of this invention by displacing part of the bromine by chlorine in the chlorination reaction.

The Diels-Alder reaction for the production of the condensates or adducts of hexachlorocyclopentadiene with allyl chloride is carried out by heating the reagents at a temperature in the range of about 85° C. to about 150° C. The reaction goes quite readily and requires no catalyst. While solvents may be used, they are not necessary.

The substitution chlorination of the adducts for production of the insecticides of this invention is carried out by contacting the adduct in the liquid phase with chlorine gas at an elevated temperature in the range of about 20° C. to about 240° C. below the temperature at which the product decomposes in the presence of a free radical forming initiator. Temperatures in the range of about 50° C. to about 100° C. are particularly suitable. Initiators which are useful include ultraviolet light, peroxides and hydroperoxides, and peracids both organic and inorganic. Specific initiators include benzoyl peroxide, peracetic acid, tertiary butyl peroxide, cumene hydroperoxide, and persulfuric acid. Solvents which are useful in the chlorination are halogenated volatile organic solvents such as carbon tetrachloride, chloroform, methylene chloride, ethylene chloride, and trichloroethylene.

The products of this invention with eight chlorine atoms in the molecule appear to have the optimum in toxicity to insects and with minimum mammalian toxicity for its particular chlorine content. Further chlorination to a total of 9 chlorine atoms decreases the toxicity to insects but not to mammals. Accordingly, these products find a wide utility in the insecticide field.

The product of chlorination of the adduct of hexachlorocyclopentadiene and allyl chloride is essentially 2-(dichloromethyl) - 1,4,5,6,7,7-hexachlorobicyclo[2.2.1]-5-heptene and, although contaminated with by-products, it does not need to be separated therefrom for commercial utilization as an insecticide. Moreover, this product prepared in this manner is more economical to produce than the pure product as would be obtained by treatment of the hexachlorocyclopentadiene—acrolein adduct with phosphorus pentachloride or by purification of the crude chlorination mixture obtained from the hexachlorocyclopentadiene-allyl chloride adduct. It is to be understood, therefore, that this invention is not limited to the pure chemical compound but includes as well the compositions which consist essentially of 2-(dichloromethyl)-1,4,5,6,7,7-hexachlorobicyclo[2.2.1]-5-heptene. The latter compound thus is present in effective amounts in the product of chlorination of the hexachlorocyclopentadiene-allyl chloride adduct where the chlorine content of the product of chlorination is in the range of about 72–74% chlorine corresponding to about $8 \pm 0.5$ chlorine atoms per molecule.

The compounds of this invention are used as the sole toxic agent in pesticidal formulations or in admixture with minor amounts of other toxicants for modification of the properties of the individual toxicants. They may be used, for example, in admixture with toxaphene, DDT, thanite, chlordane, rotenone, pyrethrin, and the like in many of the formulations suggested below.

The compounds of this invention are made into pesticidal compositions for use against insects by dilution with an insecticidal adjuvant as a carrier therefor, by dispersing in an organic solvent, or in water, or by diluting with a solid insecticidal adjuvant as a carrier. Dispersions containing a surface active dispersing agent have the advantage of spreading the toxic substance more effectively over the plant surface. Dispersions in organic solvents include dispersions in alcohols, pine oil, hydrocarbon solvents, difluorodichloromethane, and similar organic solvents. The compounds of this invention are also used in aerosol formulations in which difluorodichloromethane and similar aerosol propellants form the propellant vehicle.

Aqueous dispersions are made up from the compounds of this invention, a surface active dispersing agent and water as the essential ingredients. The amount of the compounds of this invention in the aqueous dispersions when diluted for spraying of plants will be in the range of 10.0% to about 0.0001% of the aqueous dispersion.

Suitable surface-active dispersing agents for use in the compositions of this invention are those disclosed in Chemistry of Insecticides, Fungicides, and Herbicides by Donald E. H. Frear, 2nd ed. (1948, pages 5 and 280–287) for use with known insecticides and include soaps of resin, alginic, and fatty acids and alkali metals or alkali amines or ammonia, saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, china clay, kaolin, attapulgite and bentonite and related hydrated aluminum silicates having the property of forming a colloidal gel. Among the other surface-active dispersing agents which are useful in the compositions of this invention are the omega-substituted polyethylene glycols of relative long-chain length, particularly those in which the omega substituent is aryl, alkyl, or acyl. Compositions of the chlorinated adduct, toxic material and surface-active dispersing agent will in some instances have more than one surface-active dispersing agent for a particular type of utility, or in addition to a surface-active dispersing agent, hydrocarbons such as kerosene and mineral oil will also be added as improvers. Thus the toxic material may contain a clay as the sole adjuvant or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents. Thus the chlorinated adduct mixtures admixed with those inert materials which facilitate the mechanical distribution of the toxicant in accordance with this invention are those containing the above-listed surface-active dispersing agents and hydrocarbon solvent dispersing agents.

The amount of toxicant in the composition with the inert material which facilitates the mechanical distribution of the toxicant will depend upon the type of inert material and the use to which it is to be put. The compositions will generally contain less than about 30% toxicant. Agricultural dusts may contain 40–60% toxicant as concentrates and will generally contain 10–30% toxicant in the form as used. Household sprays will contain from 0.1 to 10% toxicant, preferably about 2.5% in deodorized kerosene, but concentrates may contain 25–90% chlorinated adduct. Agricultural sprays will, likewise, contain 0.1 to 10% of the toxicant. Aqueous emulsions will contain sufficient surface-active dispersing agent to maintain an emulsion of the toxicant during the spraying process. Concentrates from which emulsions are made may contain 25–90% toxicant along with the surface-active dispersing agent.

For many purposes, it may be desirable to use the toxicant in combination with other insecticidal toxicants. Many toxicants have a very high knockdown in relatively dilute solutions, but higher concentrations must be used in order to obtain the desired degree of kill. Due to the very high degree of killing power which the toxicant of this invention possesses, these compounds may be added to such toxicants, thereby enabling the use of much more dilute solutions than would otherwise be possible. Toxicants with which these chlorinated adducts may be combined include such compounds as rotenone, pyrethrum, and organic thiocyanates such as alkyl thiocyanates, thiocyanoethers such as β-butoxy-β'-thiocyanoethyl ether, and terpene thiocyanoacylates such as isobornyl thiocyanoacetate, fenchyl thiocyanoacetate, isobornyl α-thiocyanopropionate, etc.

The insecticidal compositions of this invention are useful in combatting flies, mosquitoes, roaches, moths, carpet beetles, bedbugs, boll weevils, boll worms, army worms, grasshoppers, and many other pests.

What I claim and desire to protect by Letters Patent is:

1. The method of producing a compound represented by the planar structural formula

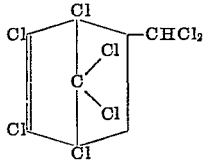

which comprises reacting a hexachlorocyclopentadiene-allyl chloride adduct with chlorine gas in the presence of a free radical forming initiator at a temperature, in the range of about 20° C. to about 240° C., below the decomposition temperature of the product to a chlorine content in the range of about 72% to about 74%.

2. A compound represented by the planar structural formula

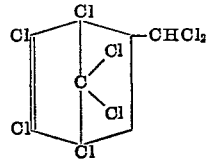

said compound having a boiling point range of 135–148° C./0.6 mm.

3. A composition consisting essentially of a compound represented by the planar structural formula

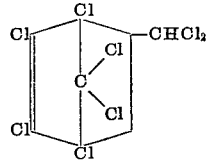

and containing in addition thereto by-products of the chlorination of the Diels-Alder adduct of hexachlorocyclopentadiene and allyl chloride with chlorine gas at a temperature in the range of about 20° C. to about 240° C. to a chlorine content in the range of about 72–74%, said compound having a boiling point range of 135–148° C./ 0.6 mm.

4. An insecticidal composition comprising the compound of claim 2 and an insecticidal adjuvant as a carrier therefor.

5. An insecticidal composition comprising the composition of claim 3 and an insecticidal adjuvant as a carrier therefor.

References Cited in the file of this patent
UNITED STATES PATENTS

| | | |
|---|---|---|
| 2,352,606 | Alder et al. | July 4, 1944 |
| 2,657,168 | Buntin | Oct. 27, 1953 |
| 2,676,132 | Bluestone | Apr. 20, 1954 |